United States Patent
Vasquez et al.

(10) Patent No.: US 9,441,745 B2
(45) Date of Patent: Sep. 13, 2016

(54) APPARATUS TO INTERFACE WITH A CORRUGATED DIAPHRAGM

(71) Applicant: Emerson Process Management Regulator Technologies, Inc., McKinney, TX (US)

(72) Inventors: Ernesto Vasquez, McKinney, TX (US); James Lyman Griffin, Jr., McKinney, TX (US); Andrew Jared Lukensmeyer, McKinney, TX (US); Tony Alan Durant, McKinney, TX (US); Kunrong Matthews, Carrollton, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 14/195,450

(22) Filed: Mar. 3, 2014

(65) Prior Publication Data

US 2015/0247582 A1    Sep. 3, 2015

(51) Int. Cl.
| | |
|---|---|
| *F16K 31/12* | (2006.01) |
| *F16K 15/02* | (2006.01) |
| *F16K 7/12* | (2006.01) |
| *F16K 17/04* | (2006.01) |
| *G05D 16/06* | (2006.01) |

(52) U.S. Cl.
CPC .............. *F16K 15/021* (2013.01); *F16K 7/12* (2013.01); *F16K 17/044* (2013.01); *G05D 16/063* (2013.01); *G05D 16/0633* (2013.01); *Y10T 137/7793* (2015.04); *Y10T 137/7819* (2015.04); *Y10T 137/7929* (2015.04)

(58) Field of Classification Search
CPC .. F16K 7/17; G05D 16/063; G05D 16/0633; Y10T 37/7793; Y10T 37/7819; Y10T 37/782
USPC .......................... 251/331; 92/102, 104, 98 R
See application file for complete search history.

(56) References Cited

U.S. PATENT DOCUMENTS

| | | | |
|---|---|---|---|
| 330,263 A | 11/1885 | Robertson | |
| 466,275 A | 12/1891 | Fasoldt | |
| 1,045,791 A | 11/1912 | Hodge | |
| 1,286,397 A * | 12/1918 | Olsen | ....................... 137/505.36 |

(Continued)

FOREIGN PATENT DOCUMENTS

| | | |
|---|---|---|
| DE | 202004006191 | 8/2004 |
| EP | 0192625 | 8/1986 |

(Continued)

OTHER PUBLICATIONS

Flat, Merriam-Webster. Jul. 2015.*

(Continued)

*Primary Examiner* — R. K. Arundale
(74) *Attorney, Agent, or Firm* — Hanley, Flight & Zimmerman, LLC

(57) ABSTRACT

Apparatus to interface with a corrugated profile are disclosed. An example apparatus for use with a fluid regulator includes an elastomeric ring having a corrugated profile that corresponds to a corrugated profile of a diaphragm of the fluid regulator. The elastomeric ring is to be positioned between a valve body and a bonnet of the fluid regulator to clamp the diaphragm between the valve body and the bonnet. A metallic ring positioned between the valve body and the bonnet engages the elastomeric ring to support the elastomeric ring.

15 Claims, 6 Drawing Sheets

(56) References Cited

U.S. PATENT DOCUMENTS

| | | | |
|---|---|---|---|
| 1,452,252 A * | 4/1923 | Muller | 137/505.36 |
| 1,543,264 A | 6/1925 | Morgan | |
| 1,891,547 A | 12/1932 | Krichbaum | |
| 2,082,227 A | 6/1937 | Stettner | |
| 2,348,388 A | 5/1944 | Jenkins | |
| 2,521,637 A | 9/1950 | Lack | |
| 2,612,728 A | 10/1952 | Jacobsson | |
| 2,664,674 A | 1/1954 | Niesemann | |
| 2,667,127 A | 1/1954 | Rimann | |
| 2,707,966 A | 5/1955 | Taplin | |
| 2,806,481 A | 9/1957 | Faust | |
| 2,894,526 A | 7/1959 | Booth et al. | |
| 2,918,081 A | 12/1959 | Laurer, Jr. | |
| 2,942,624 A | 6/1960 | Good | |
| 3,113,756 A | 12/1963 | Griffo | |
| 3,120,377 A | 2/1964 | Lipschultz et al. | |
| 3,387,622 A | 6/1968 | Weinstein | |
| 3,434,395 A | 3/1969 | Londal | |
| 3,503,307 A | 3/1970 | Migdal | |
| 3,586,037 A | 6/1971 | Zimmer | |
| 3,667,722 A | 6/1972 | Katz et al. | |
| 3,819,286 A | 6/1974 | Bianchi | |
| 4,055,198 A | 10/1977 | Iannelli | |
| 4,196,744 A | 4/1980 | Bradshaw | |
| 4,457,329 A | 7/1984 | Werley et al. | |
| 4,471,802 A | 9/1984 | Pryor | |
| 4,543,832 A | 10/1985 | Van Over | |
| 4,624,442 A | 11/1986 | Duffy et al. | |
| 4,741,252 A | 5/1988 | Harter et al. | |
| 5,292,024 A | 3/1994 | Koefelda et al. | |
| 5,335,584 A | 8/1994 | Baird | |
| 5,443,083 A | 8/1995 | Gotthelf | |
| 5,449,003 A | 9/1995 | Sugimura | |
| 5,567,130 A | 10/1996 | Kvinge et al. | |
| 5,586,569 A | 12/1996 | Hanning et al. | |
| 5,615,701 A | 4/1997 | Yamabe et al. | |
| 5,725,007 A | 3/1998 | Stubbs | |
| 5,755,254 A | 5/1998 | Carter et al. | |
| 5,829,477 A | 11/1998 | Graham et al. | |
| 5,901,742 A | 5/1999 | Kleppner et al. | |
| 5,904,178 A | 5/1999 | Bracey et al. | |
| 5,950,652 A | 9/1999 | Morgan | |
| 5,950,692 A | 9/1999 | Georgs et al. | |
| 6,003,545 A | 12/1999 | Dukas et al. | |
| 6,019,121 A | 2/2000 | Uehara | |
| 6,039,071 A | 3/2000 | Tomita et al. | |
| 6,276,907 B1 | 8/2001 | Cooper et al. | |
| 6,536,466 B1 | 3/2003 | Rockwell | |
| 7,357,143 B2 | 4/2008 | Cho et al. | |
| 8,408,418 B2 | 4/2013 | Kuzelka | |
| 8,459,297 B2 | 6/2013 | Clifford | |
| 2005/0116427 A1 | 6/2005 | Seidel et al. | |
| 2006/0169328 A1 * | 8/2006 | Cho et al. | 137/505.42 |
| 2006/0289824 A1 | 12/2006 | Wincek | |
| 2009/0065073 A1 | 3/2009 | Davis | |
| 2009/0301582 A1 | 12/2009 | Wakeman | |
| 2009/0314359 A1 | 12/2009 | Woelfges | |
| 2011/0000553 A1 | 1/2011 | Clifford | |
| 2011/0174395 A1 | 7/2011 | Clifford et al. | |
| 2011/0174398 A1 | 7/2011 | Clifford et al. | |
| 2012/0241033 A1 | 9/2012 | Clifford et al. | |
| 2014/0034155 A1 | 2/2014 | Askew | |
| 2015/0034178 A1 | 2/2015 | Vasquez et al. | |

FOREIGN PATENT DOCUMENTS

| | | |
|---|---|---|
| EP | 0716230 | 6/1996 |
| EP | 0727603 | 8/1996 |
| FR | 2878985 | 6/2006 |
| GB | 335044 | 9/1930 |
| GB | 451379 | 8/1936 |
| GB | 521273 | 5/1940 |
| GB | 834574 | 5/1960 |
| GB | 1230715 | 5/1971 |
| GB | 2125938 | 3/1984 |
| GB | 2222869 | 3/1990 |
| GB | 2464283 | 4/2010 |
| WO | 9810208 | 3/1998 |
| WO | 2011002559 | 1/2011 |

OTHER PUBLICATIONS

International Searching Authority, "International Search Report," issued in connection with international application serial No. PCT/US2012/026099, issued May 11, 2012, 2 pages.

International Searching Authority, "Written Opinion of the International Searching Authority," issued in connection with international application serial No. PCT/US2012/026099, issued May 11, 2012, 6 pages.

Emerson Process Management, "Type 95H," Fisher, Jan. 2007, 1 page.

Tescom, "44-1100 Series," Specifications, May 2007, 2 pages.

Tescom, "44-1300 Series," Specifications, Jun. 2006, 2 pages.

Tescom, "44-2200 Series," Specifications, Nov. 2010, 2 pages.

United States Patent and Trademark Office, "Office Action," issued in connection with U.S. Appl. No. 13/052,475, mailed on May 28, 2013, 25 pages.

United States Patent and Trademark Office, "Final Office Action," issued in connection with U.S. Appl. No. 13/052,475, mailed on Nov. 5, 2013, 23 pages.

United States Patent and Trademark Office, "Office Action," issued in connection with U.S. Appl. No. 13/052,475, mailed on Mar. 10, 2014, 25 pages.

International Searching Authority, "International Search Report," issued in connection with International Patent Application No. PCT/US2010/034798, mailed on Oct. 31, 2011, 4 pages.

International Searching Authority, "Written Opinion of the International Search Authority," issued in connection with International Patent Application No. PCT/US2010/034798, mailed on Oct. 31, 2011, 5 pages.

International Searching Authority, "International Preliminary Report on Patentability," issued in connection with International Patent Application No. PCT/US2010/034798, mailed on Jan. 4, 2012, 6 pages.

United States Patent and Trademark Office, "Final Office Action," issued in connection with U.S. Appl. No. 13/052,451, mailed on Dec. 22, 2014, 16 pages.

United States Patent and Trademark Office, "Final Office Action," issued in connection with U.S. Appl. No. 13/052,470, mailed on Jul. 25, 2014, 28 pages.

United States Patent and Trademark Office, "Non-Final Office Action," issued in connection with U.S. Appl. No. 13/052,451, mailed on Jul. 24, 2014, 22 pages.

United States Patent and Trademark Office, "Final Office Action," issued in connection with U.S. Appl. No. 12/496,868, mailed on Jul. 5, 2012, 17 pages.

United States Patent and Trademark Office, "Non-Final Office Action," issued in connection with U.S. Appl. No. 12/496,868, mailed on Feb. 27, 2012, 21 pages.

United States Patent and Trademark Office, "Notice of Allowance and Fee(s) Due," issued in connection with U.S. Appl. No. 12/496,868, mailed on Feb. 27, 2013, 13 pages.

United States Patent and Trademark Office, "Requirement for Restriction/Election," issued in connection with U.S. Appl. No. 12/496,868, mailed on Jan. 6, 2012, 7 pages.

United States Patent and Trademark Office, "Final Office Action," issued in connection with U.S. Appl. No. 13/052,470, mailed on Nov. 7, 2013, 17 pages.

United States Patent and Trademark Office, "Non-Final Office Action," issued in connection with U.S. Appl. No. 13/052,470, mailed on Mar. 6, 2014, 26 pages.

United States Patent and Trademark Office, "Requirement for Restriction/Election," issued in connection with U.S. Appl. No. 13/052,470, mailed on May 13, 2013, 9 pages.

United States Patent and Trademark Office, "Non-Final Office Action," issued in connection with U.S. Appl. No. 13/052,470, mailed on Jun. 26, 2013, 24 pages.

(56) References Cited

OTHER PUBLICATIONS

United States Patent and Trademark Office, "Advisory Action," issued in connection with U.S. Appl. No. 13/052,451, mailed on Jun. 13, 2014, 4 pages.
International Searching Authority, "International Search Report," issued in connection with International Application Serial No. PCT/US2012/025536, mailed May 22, 2012, 3 pages.
International Searching Authority, "Written Opinion of the International Searching Authority," issued in connection with International Application Serial No. PCT/US2012/025536, mailed May 22, 2012, 7 pages.
European Patent Office, "Communication Pursuant to Article 94(3) EPC," issued in connection with European Patent Application No. 12706975.5, mailed on Nov. 4, 2014, 7 pages.
European Patent Office, "Communication Pursuant to Article 94(3) EPC," issued in connection with European Patent Application No. 12706976.3, mailed on Nov. 10, 2014, 7 pages.
United States Patent and Trademark Office, "Non-Final Office Action," issued in connection with U.S. Appl. No. 13/052,470, mailed on Nov. 3, 2014, 25 pages.
United States Patent and Trademark Office, "Final Office Action," issued in connection with U.S. Appl. No. 13/052,475, mailed on Jul. 25, 2014, 25 pages.
United States Patent and Trademark Office, "Final Office Action," issued in connection with U.S. Appl. No. 13/052,470, mailed on Apr. 29, 2015, 24 pages.
United States Patent and Trademark Office, "Advisory Action," issued in connection with U.S. Appl. No. 13/052,451, mailed on Mar. 12, 2015, 3 pages.
United States Patent and Trademark Office, "Advisory Action," issued in connection with U.S. Appl. No. 13/052,475, mailed on Nov. 14, 2014, 3 pages.
United States Patent and Trademark Office, "Final Office Action," issued in connection with U.S. Appl. No. 13/052,451, mailed on Apr. 3, 2014, 14 pages.
United States Patent and Trademark Office, "Requirement for Restriction/Election," issued in connection with U.S. Appl. No. 13/052,451, mailed on Jun. 12, 2013, 6 pages.
United States Patent and Trademark Office, "Non-Final Office Action," issued in connection with U.S. Appl. No. 13/052,451, mailed on Jul. 23, 2013, 26 pages.
United States Patent and Trademark Office, "Final Office Action," issued in connection with U.S. Appl. No. 13/052,451, mailed on Dec. 30, 2013, 17 pages.
United States Patent and Trademark Office, "Non-Final Office Action," issued in connection with U.S. Appl. No. 13/954,527, mailed on Feb. 13, 2015, 34 pages.
International Searching Authority, "International Search Report," issued in connection with international application serial No. PCT/US2014/049030, mailed on Oct. 21, 2014, 3 pages.
International Searching Authority, "Written Opinion of the International Searching Authority," issued in connection with international application serial No. PCT/US2014/049030, mailed on Oct. 21, 2014, 5 pages.
United States Patent and Trademark Office, "Final Office Action," issued in connection with U.S. Appl. No. 13/954,527, mailed May 29, 2015, 24 pages.
United States Patent and Trademark Office, "Non-Office Action," issued in connection with U.S. Appl. No. 13/954,527, mailed on Sep. 11, 2015, 30 pages.
United States Patent and Trademark Office, "Advisory Action", issued in connection with U.S. Appl. No. 13/954,527, dated Jul. 31, 2015 (7 pages).
Patent Cooperation Treaty, "International Search Report," issued in connection with International Application Serial No. PCT/US2015/032919, mailed Sep. 11, 2015 (4 pages).
Patent Cooperation Treaty, "International Search Report", issued in connection with International application No. PCT/US2015/032919, mailed May 10, 2016 (7 pages).
Patent Cooperation Treaty, "Written Opinion", issued in connection with International application No. PCT/US2015/032919, mailed May 10, 2016 (10 pages).
Patent Cooperation Treaty, "International Preliminary Report on Patentability", issued in connection with International application No. PCT/US2014/049030, mailed Feb. 2, 2016 (1 page).
Patent Cooperation Treaty, "Written Opinion", issued in connection with International application No. PCT/US2014/049030, mailed Feb. 11, 2016 (6 pages).

* cited by examiner

APPARATUS TO INTERFACE WITH A CORRUGATED DIAPHRAGM

FIELD OF THE DISCLOSURE

This disclosure relates generally to fluid regulators and, more particularly, to apparatus to interface with a corrugated diaphragm.

BACKGROUND

Fluid regulators are commonly distributed throughout process control systems to control flow rates and/or pressures of various fluids (e.g. liquids, gases, etc.). Fluid regulators are commonly used to regulate the pressure of a fluid to a substantially constant value. A fluid regulator typically has an inlet to receive a supply fluid, an outlet to provide the supply fluid, and a sensing element or diaphragm to measure and regulate pressure within the fluid regulator. Some diaphragm fluid regulators have a seating element that moves when fluid contacts and displaces the diaphragm. In some such diaphragm fluid regulators, the movement of the sealing element affects the amount of fluid flowing between the inlet and the outlet.

Elastomeric diaphragms are cost effective and are typically used with low-pressure and low-temperature applications. For high-pressure and high-temperature applications, fluid regulators often employ a metal diaphragm (e.g., a stainless steel diaphragm). Some metal diaphragms include convolutions or wave-shaped contours to increase a sensitivity of the diaphragm.

SUMMARY

In one example, an apparatus for use with a fluid regulator includes an elastomeric ring having a corrugated profile that corresponds to a corrugated profile of a diaphragm of the fluid regulator. The elastomeric ring is to be positioned between a valve body and a bonnet of the fluid regulator to clamp the diaphragm between the valve body and the bonnet. A metallic ring positioned between the valve body and the bonnet engages the elastomeric ring to support the elastomeric ring.

In another example, an apparatus includes a valve body defining a fluid flow passageway, a diaphragm having a corrugated profile and positioned between the valve body and a bonnet, and a washer to engage an outer circumferential portion of the diaphragm to clamp the diaphragm between the valve body and the bonnet. The washer is positioned between the valve body and the bonnet and includes an elastomeric ring having a corrugated profile that corresponds to and engages a portion of the diaphragm having the corrugated profile.

In another example, an apparatus includes means for sensing pressure within a fluid flow passageway. The means for sensing has a corrugated profile and is positioned between a valve body and a bonnet. The apparatus includes means for clamping the means for sensing between the valve body and the bonnet. The means for clamping is positioned between the valve body and the bonnet and includes means for engaging the means for sensing. The means for engaging has a corrugated profile that corresponds to and engages a portion of the means for sensing.

Figure 1:
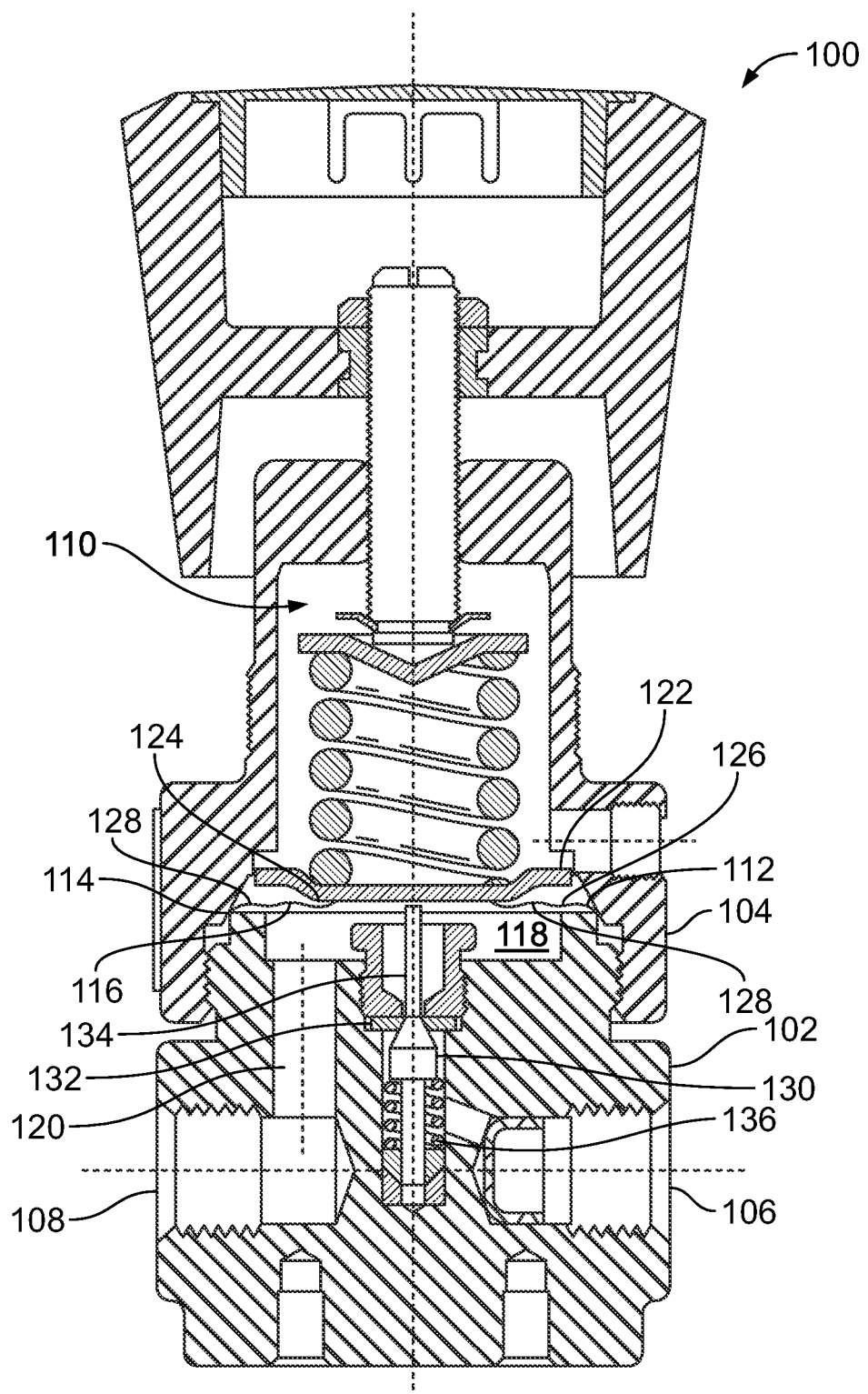
FIG. 1 is a cross-sectional view of a known fluid regulator.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Many known fluid regulators employ a diaphragm that interacts with a fluid in a sensing chamber. The fluid may displace the diaphragm which, in turn, displaces a valve stem. Such displacement of the valve stem causes a sealing poppet fixed to the valve stem to displace, thereby altering the fluid flow and/or the pressure differential between an inlet and an outlet of the fluid regulator. For high-pressure and high-temperature applications, a metal diaphragm (e.g., a stainless steel diaphragm) is often employed within a fluid regulator. Repeated cycling of the metal diaphragm may cause premature failure or cyclical loading failure (e.g., fatigue) due to stress concentrations. Alternatively, repeated cycling of the metal diaphragm may result in a portion of the diaphragm becoming dislodged (e.g., unclamped) and, thus, may cause performance degradation and/or loss of the primary function of the fluid regulator.

The geometry of the diaphragm may also significantly impact stress concentrations within the diaphragm. For example, some known metal diaphragms have wave-shaped contours or corrugations to increase sensitivity of the diaphragm. However, stress concentrations within such corrugated diaphragms often occur where the corrugated surface of the diaphragm is clamped and/or constrained. The manner in which the diaphragm is constrained (e.g., clamped) may also have a significant impact on the stress concentrations within the diaphragm and/or the likelihood of the diaphragm becoming dislodged. Some known fluid regulators clamp a peripheral edge of a metal diaphragm between a regulator valve body and a bonnet. Such a clamped connection can cause stress concentrations in the diaphragm, which can lead to premature failure or fatigue of the diaphragm and/or the diaphragm being pulled out of its peripheral restraints, thereby reducing the life cycle of the diaphragm and/or increasing maintenance costs.

The example fluid regulators described herein substantially improve a cycle life or fatigue life of a corrugated sensing element or diaphragm. More specifically, the example fluid regulators described herein reduce localized stress concentrations to portions of the corrugated diaphragm by including a corrugated elastomeric ring or retainer to constrain or clamp the corrugated diaphragm between a valve body and a bonnet of the example fluid regulators.

An example fluid regulator described herein includes a corrugated elastomeric ring or retainer adjacent a sensing chamber of the fluid regulator to clamp a peripheral portion of the corrugated diaphragm between a valve body and a bonnet of the fluid regulator. The corrugated surface and the elastomeric material of the retainer affect the amount of stress imparted to the corrugated diaphragm during operation. For example, the corrugated surface of the retainer has a cross-sectional shape or profile that is substantially similar to a cross-sectional shape or profile of the peripheral portion of the diaphragm engaged by the retainer to substantially increase a contact surface area between the retainer and the corrugated diaphragm.

To further increase the contact surface area between the retainer and the corrugated diaphragm of the example fluid regulator, the retainer is composed of, for example, an elastomeric material. The elastomeric material of the retainer allows the corrugated surface of the retainer to conform to the corrugated surface of the diaphragm. Because the elastomeric corrugated retainer can conform to the corrugated surfaces of the diaphragm, the elastomeric material allows for increased manufacturing tolerances compared to a less elastic material such as, for example, a metallic material.

The increased contact surface area between the corrugated elastomeric retainer and the corrugated diaphragm reduces stress concentrations by distributing stresses imparted on the corrugated diaphragm across a greater area or portion of the diaphragm and, thus, significantly reduces localized stresses or fatigue deformation of the corrugated diaphragm. As a result, the corrugated elastomeric retainer significantly improves the cycle or fatigue life of the corrugated diaphragm.

In some example fluid regulators described herein, the corrugated elastomeric retainer may be received by a metallic ring or retainer to form a washer. For example, the corrugated elastomeric retainer may be inserted into a circumferential groove of the metallic retainer. With such example fluid regulators, the metallic retainer of the washer may provide structural support to the corrugated elastomeric retainer as it clamps the corrugated diaphragm between the valve body and the bonnet. Additionally or alternatively, the corrugated elastomeric retainer and the metallic retainer of the washer may be positioned within a cavity adjacent the sensing chamber of the fluid regulator that is formed by a shoulder of the valve body and a shoulder of the bonnet. For example, a first portion of the washer may be received within a groove defined by the shoulder of the valve body, and a second portion of the washer may be received within a groove defined by the shoulder of the bonnet.

In other example fluid regulators described herein, a corrugated pusher plate coupled to a stem engages a portion of the corrugated diaphragm. For example, a portion of the pusher plate has a corrugated surface with a cross-sectional shape or profile that is substantially similar to a cross-sectional shape or profile of a portion of the corrugated diaphragm.

Figure 2:
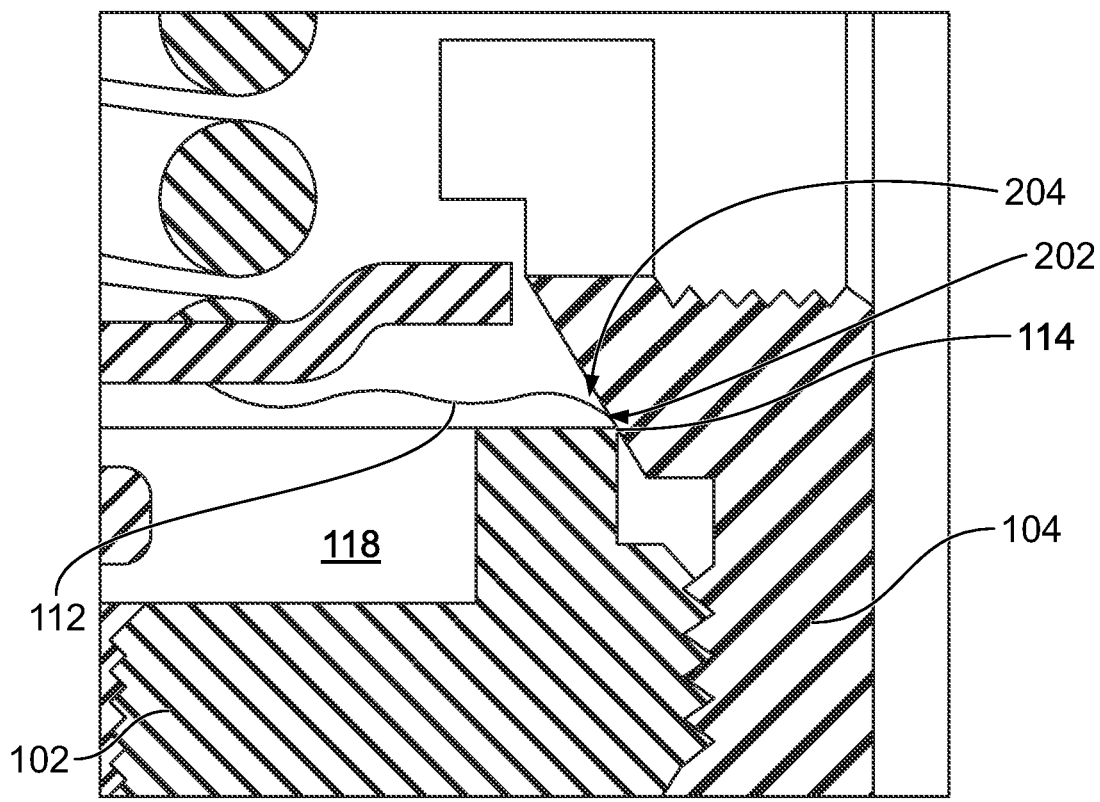
FIG. 2 is enlarged cross-sectional view of a portion of the known fluid regulator of FIG. 1.

Before discussing the example fluid regulator described herein, a brief description of a known fluid regulator 100 is provided in FIGS. 1 and 2. As illustrated in FIG. 1, the example fluid regulator 100 includes a valve body 102 threadably coupled to a bonnet 104 that defines a fluid passageway between an inlet 106 and an outlet 108. A load assembly 110 is disposed within the bonnet 104 and is adjustable to provide a load to a diaphragm 112 that corresponds to a desired fluid outlet pressure. A peripheral edge 114 of the diaphragm 112 is clamped or captured between the bonnet 104 and the valve body 102 such that a first side 116 of the diaphragm 112 and the valve body 102 define a sensing chamber 118 that is in fluid communication with the outlet 108 via a passageway 120. To provide support to the diaphragm 112, the fluid regulator 100 includes a back-up plate 122 having a substantially flat or planar contact surface 124 that engages a portion of a second side 126 of the diaphragm 112. The diaphragm 112 of the known fluid regulator 100 illustrated in FIG. 1 is a metal diaphragm having a plurality of wave-shaped contours or convolutions 128 to increase a sensitivity of the diaphragm 112. To regulate or throttle the flow of fluid between the inlet 106 and the outlet 108, a poppet 130 moves relative to a valve seat 132. The poppet 130 includes a stem 134 to engage the diaphragm 112 and the back-up plate 122. Also, as illustrated in FIG. 1, a biasing element 136 biases the poppet 130 toward the valve seat 132.

In operation, the diaphragm 112 and the back-up plate 122 move in a direction away from the stem 134 when a fluid pressure at the outlet 108 provides a force to the first side 116 of the diaphragm 112 that is greater than or equal to the force provided to the second side 126 by the load assembly 110. As a result, the poppet 130 sealingly engages the valve seat 132 to restrict fluid flow between the inlet 106 and the outlet 108. When the fluid pressure at the outlet 108 decreases such that the force provided to the first side 116 is less than the force provided to the second side 126 by the load assembly 110, the diaphragm 112 flexes or moves toward the valve body 102 and engages the stem 134. As a result, the poppet 130 moves in a direction away from the valve seat 132 to allow pressurized fluid flow between the inlet 106 and the until the forces on the sides 116 and 126 of the diaphragm 112 are balanced.

As most clearly illustrated in FIG. 2, the peripheral edge 114 of the diaphragm 112 is clamped between the bonnet 104 and the valve body 102 at a pinch point or area 202. Clamping the diaphragm 112 in such a manner is disadvantageous because it generates relatively high stress concentration at an area or point 204 immediately adjacent the pinch point 202 as the diaphragm 112 flexes or bends. The pinch point 202 subjects the area 204 of the diaphragm 112 to a relatively high stress concentration. As a result, the pinch point 202 may cause the area 204 to fracture or fatigue during operation. Thus, the highly concentrated or localized stresses may reduce or limit the cycle life or fatigue life of the diaphragm 112.

Figure 3:
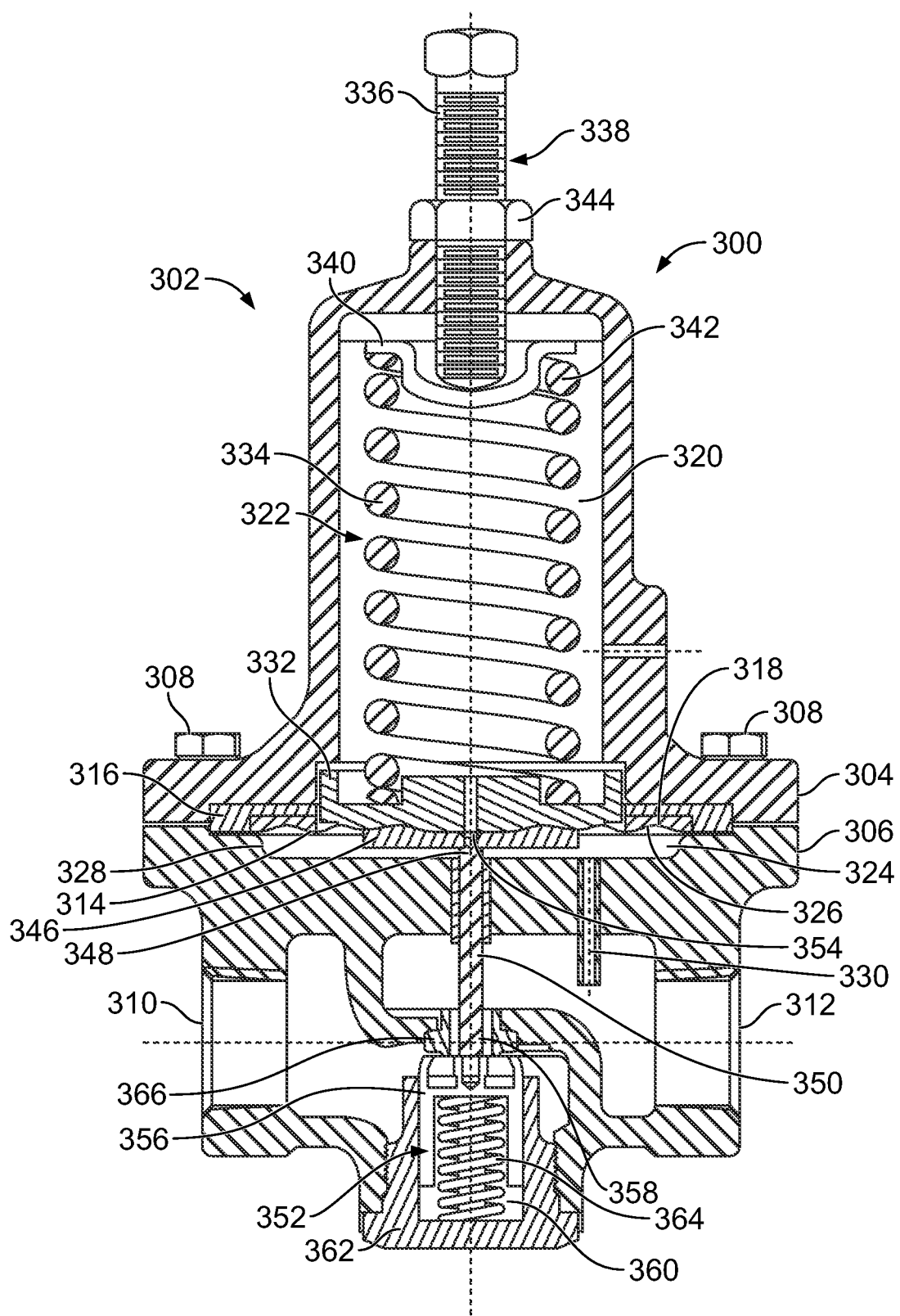
FIG. 3 is a cross-sectional view of an example fluid regulator in accordance with the teachings herein.

FIG. 3 illustrates an example fluid regulator 300 described herein. The example fluid regulator 300 includes a regulator body 302 having an upper body portion or bonnet 304 coupled to a lower body portion or valve body 306 via, for example, threaded fasteners 308. The valve body 306 forms a fluid flow path between an inlet 310 and an outlet 312 of the fluid regulator 300. A diaphragm 314 is clamped between the valve body 306 and the bonnet 304 via a ring, washer or retainer 316. For example, the diaphragm 314 is positioned such that a first side 318 of the diaphragm 314 and the bonnet 304 define a load chamber 320 to receive a load assembly 322. Additionally, a sensing chamber 324 may be defined by a second side 326 of the diaphragm 314 and an inner surface 328 of the valve body 306. The sensing chamber 324 may be fluidly coupled to the outlet 312 via a passage 330 to sense the pressure of the fluid at the outlet 312, for example.

To provide a reference force or load (e.g., a preset load) to the first side 318 of the diaphragm 314, the load assembly 322 may be operatively coupled to the first side 318 of the diaphragm 314 via a diaphragm plate or back-up plate 332. As illustrated in FIG. 3, the load assembly 322 includes a first biasing element 334 (e.g., a spring) disposed within the load chamber 320 to provide a load to the diaphragm 314 via the back-up plate 332. For example, the load is adjusted via a screw 336 of a spring adjuster 338 that engages an adjustable spring seat 340 coupled to an end 342 of the first biasing element 334. The screw 336 of the spring adjuster 338 may be held in place relative to the bonnet 304 via a jam nut 344. For example, the load provided by the first biasing element 334 may be adjusted to correspond to a desired outlet pressure.

As illustrated in FIG. 3, the second side 326 of the diaphragm 314 may engage a pusher plate 346 that is coupled to a first end 348 of a stem 350 of a valve apparatus or valve cartridge assembly 352. For example, the pusher plate 346 couples to the back-up plate 332 via an aperture 354 in the diaphragm 314. A valve plug or poppet 356 of the valve apparatus 352 is coupled to and/or adjacent a second end 358 of the stem 350 and is disposed within a cavity 360 of a valve plug guide 362. For example, a biasing element 364 is also disposed in the cavity 360 and engages the poppet 356 to bias the poppet 356 toward a valve seat 366. When the fluid regulator 300 is in a closed position, the poppet 356 engages the valve seat 366 to restrict fluid flow between the inlet 310 and the outlet 312. Conversely, when the fluid regulator 300 is in an open position, the poppet 356 is positioned away from the valve seat 366 to allow fluid flow between the inlet 310 and the outlet 312.

In operation, the example fluid regulator 300 fluidly couples to, for example, an upstream pressure source providing a relatively high pressure fluid (e.g., a gas) via the inlet 310 and fluidly couples to, for example, a low pressure downstream device or system via the outlet 312. The fluid regulator 300 regulates the outlet pressure of the fluid flowing through the fluid regulator 300 to a desired pressure that corresponds to the preset load provided by the adjustable load assembly 322. For example, the sensing chamber 324 senses a pressure of the pressurized fluid at the outlet 312 via the passage 330, which causes the diaphragm 314 to move, flex or bend in response to pressure changes in the sensing chamber 324. More specifically, the diaphragm 314 moves between a first position associated with the closed position of the fluid regulator 300 and a second position associated with the open position of the fluid regulator 300.

For example, as the fluid flows between the inlet 310 and the outlet 312, the pressure of the fluid at the outlet 312 increases and causes the diaphragm 314 to move to the position associated with the closed position of the fluid regulator 300. More specifically, as the pressure of the fluid at the outlet 312 and within the sensing chamber 324 increases, the pressure of the fluid exerts a force on the second side 326 of the diaphragm 314 to cause the diaphragm 314 and, thus, the pusher plate 346 to move in a rectilinear motion away from the valve body 306. In turn, the stem 350 causes the poppet 356 to move toward the valve seat 366 to reduce fluid flow between the inlet 310 and the outlet 312.

When a force exerted on the second side 326 of the diaphragm 314 by the pressurized fluid is greater than or equal to the reference force exerted by the load assembly 322 on the first side 318 of the diaphragm 314, the diaphragm 314 and, thus, the pusher plate 346 may move toward the first position (i.e., the position associated with the closed position of the fluid regulator 300). More specifically, the poppet 356 may move toward the valve seat 366 to prevent or restrict fluid flow between the inlet 310 and the outlet 312 when the pressure differential across the diaphragm 314 is substantially near zero (i.e., the pressure of the fluid in the sensing chamber 324 is regulated to a pressure that generates a force substantially equal to the load provided by the load assembly 322).

Conversely, when the force exerted by the biasing element 364 and the pressurized fluid on the second side 326 of the diaphragm 314 is less than the reference force exerted by the first biasing element 334 on the first side 318 of the diaphragm 314, the diaphragm 314 and, thus, the pusher plate 346 may move toward the second position (i.e., the position associated with the open position of the fluid regulator 300). In turn, the stem 350 moves away from the bonnet 304, which causes the poppet 356 to disengage from the valve seat 366 to allow or increase fluid flow between the inlet 310 and the outlet 312.

Figure 4:
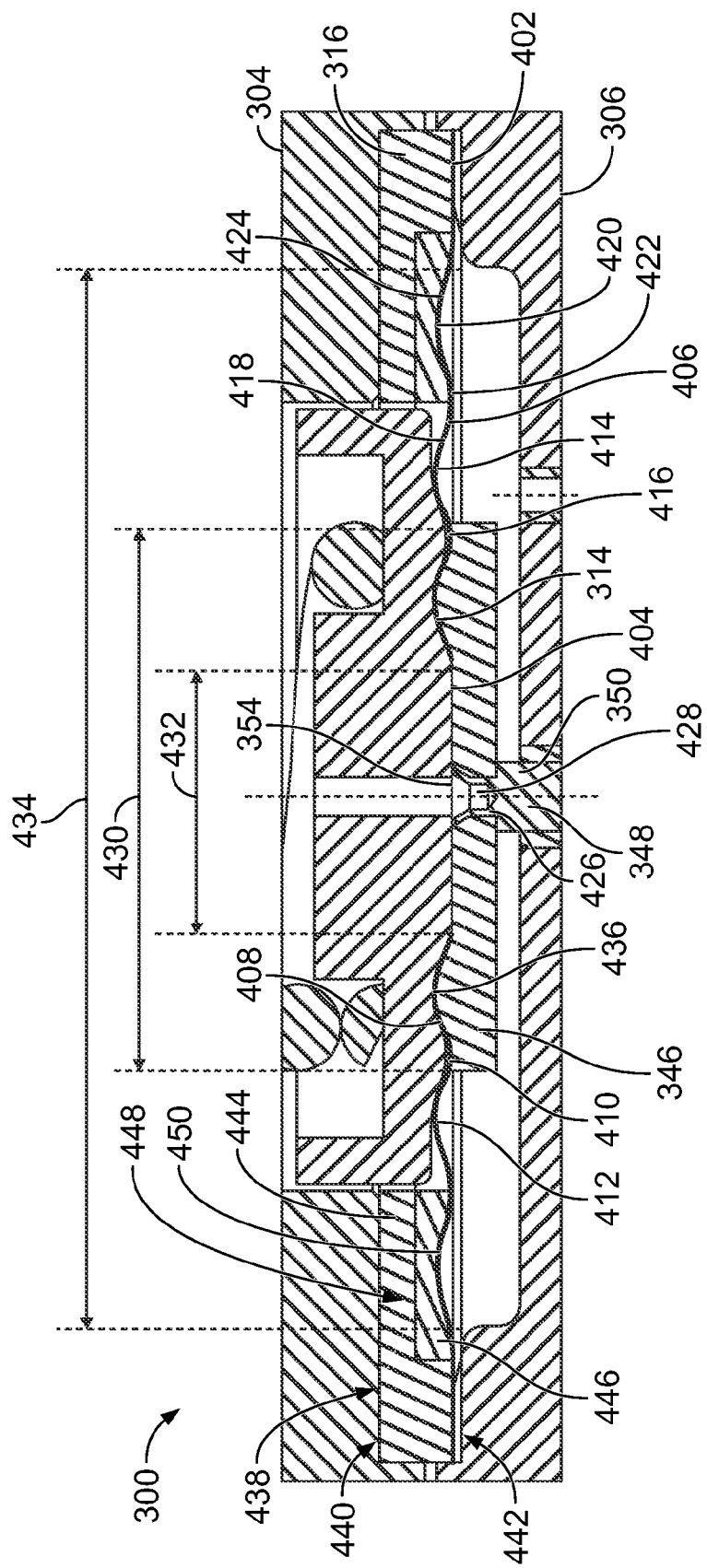
FIG. 4 is an enlarged cross-sectional view of the example fluid regulator of FIG. 3.

FIG. 4 illustrates an enlarged portion of the fluid regulator of FIG. 3. As illustrated in FIG. 4, the diaphragm 314 includes a peripheral portion 402, a central portion 404, and a flexible intermediate portion 406 between the peripheral portion 402 and the central portion 404. For example, each of the peripheral portion 402 and the central portion 404 has a substantially flat or tabular surface. The intermediate portion 406 has a plurality of wave-shaped contours, convolutions or corrugations 408 that flex or bend when the diaphragm 314 moves between the first position associated with the closed position and the second position associated with the open position.

As illustrated in FIG. 4, each of the corrugations 408 includes a convex portion (in the orientation of FIG. 4) or curved surface 410 and a concave portion (in the orientation of FIG. 4) or curved surface 412 to form a continuous smooth curve or wave-shaped corrugation 408. The convex portions 410 and/or the concave portions 412 may have substantially similar radii of curvature or may have varying radii of curvature. For example, a first convex portion 414 and/or a first concave portion 416 of a first corrugation 418 may have a first radius of curvature and a second convex portion 420 and/or a second concave portion 422 of a second corrugation 424 may have a second radius of curvature different from the first radius of curvature. The corrugations 408 may significantly increase the sensitivity of the diaphragm 314 to enable the fluid regulator 300 to have a more compact dimensional envelope. The diaphragm 314 may be composed of a metallic material such as, for example stainless steel.

FIG. 4 also illustrates the pusher plate 346 of the fluid regulator 300. For example, the pusher plate 346 has an opening or aperture 426 that receives the first end 348 of the stem 350. For example, the first end 348 of the stem 350 also receives a portion 428 of the back-up plate 332 that is positioned through the aperture of 354 of the diaphragm 314 and within the aperture 426 of the pusher plate 346.

As illustrated in FIG. 4, the pusher plate 346 has an expanded diameter 430 that is equivalent to a diameter 432 of the central portion 404 of the diaphragm 314 and at least a portion of a diameter 434 of the flexible intermediate portion 406 of the diaphragm 314. In other words, at least a portion of the pusher plate 314 engages the corrugations 408 of the flexible intermediate portion 406 of the diaphragm 314. For example, the portion of the pusher plate 346 that engages the flexible intermediate portion 406 of the diaphragm 314 has a wave-shaped contour, convolution or corrugation 436 that engages at least one of the corrugations 408 of the diaphragm 314. In particular, the corrugation 436 of the pusher plate 346 may have a shape or profile that is substantially similar to the shape or profile of corrugations 408 of the flexible intermediate portion 406 of the diaphragm 314 such that the corrugations 408 and 436 matably engage.

In operation, the diaphragm 314 engages and directs movement of the pusher plate 346. For example, the diaphragm 314 pushes the pusher plate 346 toward the valve body 306 as the diaphragm 314 flexes toward the valve body 306, and the pusher plate 346 pushes the diaphragm 314 away from the valve body 306 as the diaphragm 314 flexes away from the valve body 306. The enlarged diameter 430 of the pusher plate 346 increases the surface area over which the pusher plate 346 engages the diaphragm 314. Thus, pressure applied to the diaphragm 314 by the pusher plate 346 may be reduced. More specifically, the surface area over which the pusher plate 346 engages the diaphragm 314 is increased and, thus, the pressure applied to the diaphragm 314 is reduced by having the corrugations 436 of the pusher plate 346 match and engage the corrugations 408 of the diaphragm 314. By increasing the surface area over which the pusher plate 346 and the diaphragm 314 engage, the stress concentrations within the corrugations 408 of the flexible intermediate portion 406 of the diaphragm 314 are reduced. As a result, the cycle or fatigue life of the diaphragm 314 is significantly increased.

FIG. 4 also illustrates the peripheral portion 402 of the diaphragm 314 being clamped or captured between the bonnet 304 and the valve body 306. In particular, the retainer 316 may be employed to facilitate clamping the peripheral portion 402 of the diaphragm 314 between the bonnet 304 and the valve body 306. For example, the retainer 316 is at least partially positioned within a cavity 438 formed by a groove 440 of the bonnet 304 and a groove 442 of the valve body 306 that is adjacent the groove 440 of the bonnet 304. As illustrated in FIG. 4, the retainer 316 also engages a portion of the intermediate portion 406 of the diaphragm 314.

The retainer 316 includes a substantially rigid support ring 444 and a substantially elastic ring 446 to be received within a groove 448 of the support ring 444. As illustrated in FIG. 4, the elastic ring 446 engages portions of the peripheral and intermediate portions 402 and 406 of the diaphragm 314. Additionally or alternatively, a surface of the support ring 444 may engage a portion of the peripheral portion 402 of the diaphragm 314 to further clamp the diaphragm 314 between the valve body 306 and the bonnet 304. The support ring 444 may be composed of, for example, a metallic material such as, for example, stainless steel, aluminum, or steel.

As illustrated in FIG. 4, the elastic ring 446 may define a wave-shaped contour, convolution or corrugation 450 that engages one of the corrugations 408 of the diaphragm 314. In particular, the corrugation 450 of the elastic ring 446 may have a shape or profile that is substantially similar to the shape or profile of one of the corrugations 408 of the diaphragm 314 such that the corrugations 450 and 408 matably engage. Although not shown, the elastic ring 446 may define more than one corrugation 408 that engage more than one of the corrugations 408 of the diaphragm 314. The corrugations 408 and 450 of the diaphragm 314 and the elastic ring 446, respectively, having substantially similar profiles increases the contact surface area between the retainer 316 and the diaphragm 314 and, thus, reduces stress or strain concentrations within the diaphragm 314 by distributing stresses imparted on the diaphragm 314 across a greater area. As a result, the cycle or fatigue life of the diaphragm 314 may be significantly increased.

The elastic ring 446 may be composed of, for example, an elastomeric material such as, for example, thermoset polyurethane, thermoplastic polyurethane, or EPDM (i.e., ethylene propylene diene monomer (M-class) rubber). Because the elastomeric material of the elastic ring 446 may flex or compress to match the corrugations 408 of the diaphragm 314, the elastic ring 446 conforms to and improves engagement with the diaphragm 314. The elastic ring 446 conforming to the diaphragm 314 reduces the stress or strain that the retainer 316 imparts on the diaphragm 314. Conversely, the elastic ring 446 conforming to the diaphragm 314 reduces the stress or strain that the diaphragm 314 imparts on the elastic ring 446. As a result, the cycle or fatigue life of the elastic ring 446 may be significantly increased. Also, because the elastomeric material of the elastic ring 446 may conform to the shape of the diaphragm 314, the elastomeric material allows for increased tolerances in manufacturing the retainer 316 and, in particular, the elastic ring 446.

Figure 5:
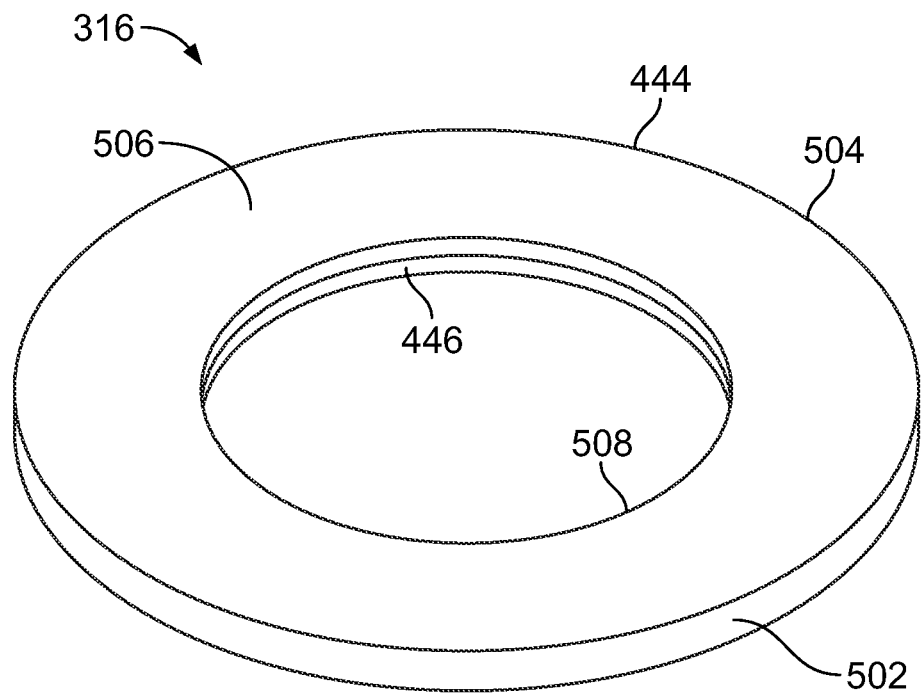
FIGS. 5 and 6 are isometric views of a corrugated washer of the example fluid regulator of FIGS. 3-4.
Figure 6:
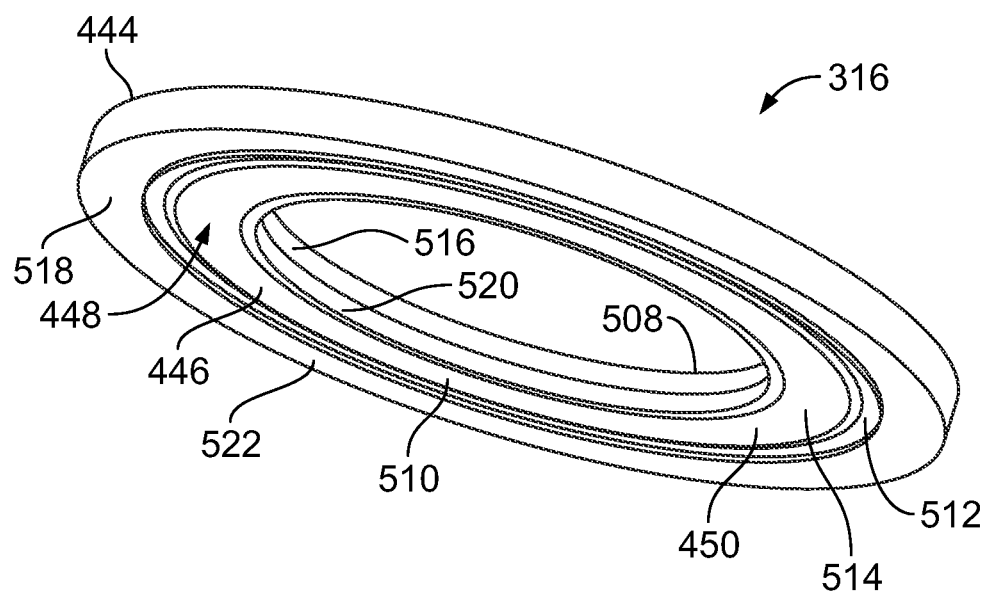

FIGS. 5 and 6 show alternative isometric views of the support ring 444 and the elastic ring 446 of the retainer 316. More specifically, FIG. 5 illustrates an outer circumferential surface 502 of the support ring 444 that defines a substantially flat outer circumferential edge 504 of the retainer 316. A first surface 506 of the support ring 444 having a substantially flat or tabular surface may be positioned between the outer circumferential edge 504 and an inner circumferential edge 508 of the retainer 326.

FIG. 6 illustrates the elastic ring 446 that is received by the groove 448 of the support ring 444. For example, a surface 510 of the elastic ring 446 defines a substantially flat circumferential portion 512 to engage part of the peripheral portion 402 of the diaphragm 314 (FIG. 4) and defines the corrugation 450 to engage at least part of the intermediate portion 406 of the diaphragm 314 (FIG. 4). More specifically, the corrugation 450 of the elastic ring 446 may form a circumferential convex surface 514. In particular, the corrugation 450 of the elastic ring 446 may have a shape or profile that is substantially similar to the shape or profile of one of the corrugations 408 of the intermediate portion 406 of the diaphragm 314 (FIG. 4).

FIG. 6 also illustrates that the groove 448 of the support ring 444 is adjacent an inner circumferential surface 516 and a substantially flat or tabular second surface 518 of the support ring 444. The elastic ring 446 aligns with the support ring 444 when the elastic ring 446 is received by the groove 448 of the support ring 444. For example, an inner circumferential surface 520 of the elastic ring 446 aligns with and is adjacent the inner circumferential surface 516 of the support ring 444 to form the substantially flat inner circumferential edge 508 of the retainer 326. Also, as illustrated in FIG. 6, the surface 510 of the elastic ring 446 aligns with and is adjacent the second surface 518 of the support ring 444. For example, the second surface 518 of the support ring 444 is adjacent the surface 510 of the elastic ring 446 and, in particular, the convex surface 516, to form a surface 522 of the retainer 316 that engages the diaphragm 314 (FIG. 4).

Figure 7:
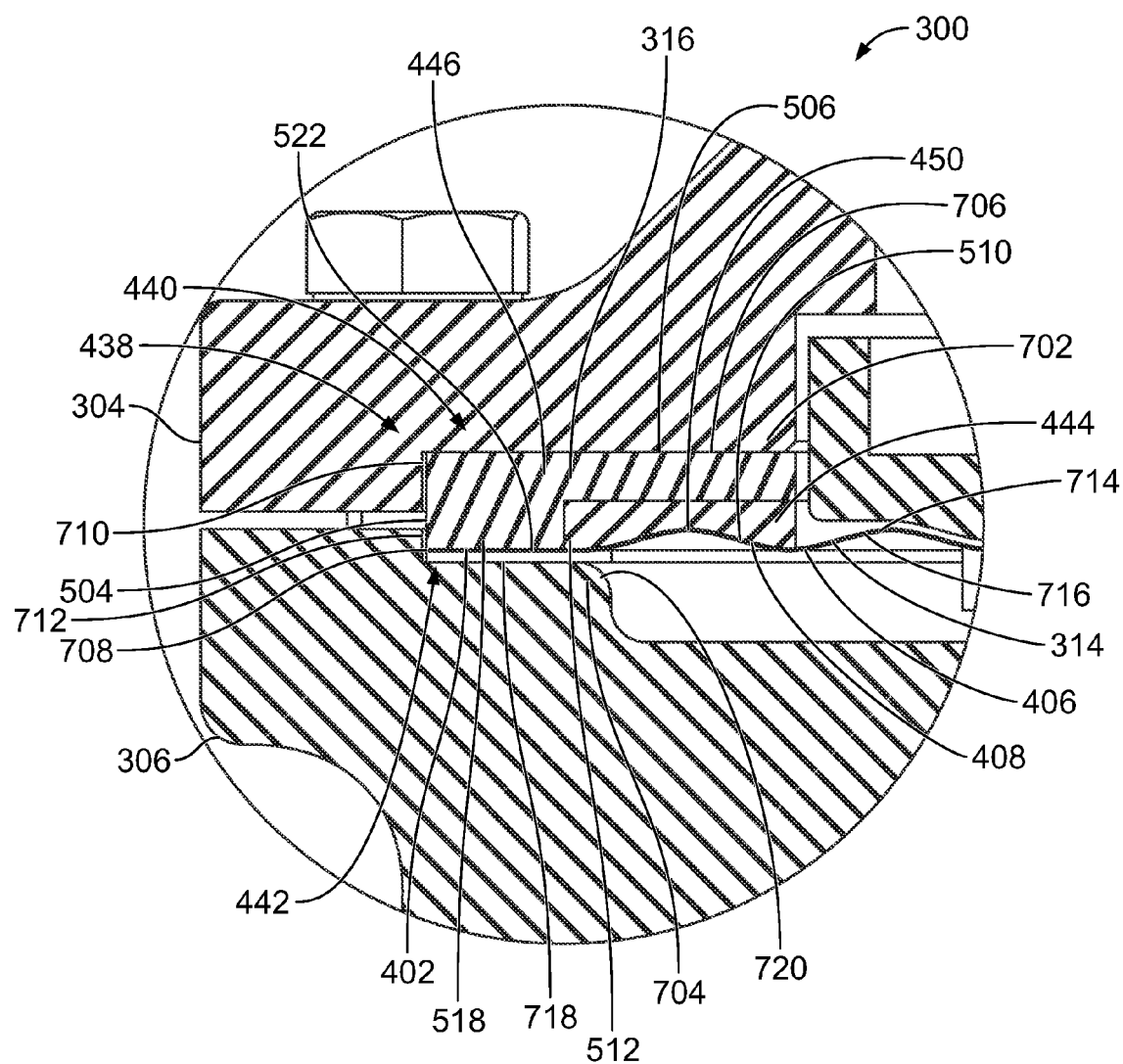
FIG. 7 is an enlarged cross-sectional view of the corrugated washer of the example fluid regulator of FIGS. 3-6.

FIG. 7 illustrates an enlarged cross-sectional view of the retainer 316 engaging the diaphragm 314 within the fluid regulator 300. For example, the retainer 316 is positioned at least partially within the cavity 438 between the valve body 306 and the bonnet 304. A portion of the retainer 316 may be received by the groove 440 formed by a shoulder 702 of the bonnet 304, and another portion of the retainer 316 may be received by the groove 442 formed by a shoulder 704 of the valve body 306. More specifically, the first surface 506 of the support ring 444 may engage a first surface 706 of the bonnet 304. A portion of the first surface 506 of the support ring 444 may extend beyond the shoulder 706 toward the center of the fluid regulator 300, for example. As illustrated in FIG. 7, the outer circumferential edge 504 of the retainer 316 is substantially flush with an outer edge 708 of the peripheral portion 402 of the diaphragm 314. For example, the outer circumferential edge 504 of the retainer 316 may abut a second surface 710 of the bonnet 304 and a portion of a first surface 712 of the valve body 306. The outer edge 708 of the diaphragm 314 may abut a portion of the first surface 712 of the valve body 306. Alternatively, a small gap may exist between the outer circumferential edge 504 and the respective surfaces 710 and 712 of the bonnet 304 and the valve body 306 and between the outer edge 708 of the diaphragm 314 and the first surface 712 of the valve body 306.

As illustrated in FIG. 7, at least a portion of the peripheral portion 402 of the diaphragm 314 is positioned within the cavity 438. A first surface 714 of the diaphragm 314 engages the surface 522 of the retainer 316 and an opposing second surface 716 of the diaphragm 314 engages the shoulder 704 of the valve body 306. Although not shown in FIG. 7, the position of the retainer 316 and the diaphragm 314 may be alternatively positioned such that the support ring 444 engages the valve body 306 and a surface of the diaphragm engages the bonnet 304.

FIG. 7 illustrates the surface 510 of the elastic ring 444 and the second surface 518 of the support ring 446 engaging the first surface 714 of the diaphragm 314. More specifically, the second surface 518 of the support ring 444 and the substantially flat portion 512 of the elastic ring 446 engage the peripheral portion 402 of the first surface 714, and the corrugation 450 of the elastic ring 444 engages a portion of the intermediate portion 406 of the first surface 714. For example, the elastic ring 444 may extend beyond the shoulder 704 of the valve body 306 to engage the intermediate portion 406 of the diaphragm 314. The corrugation 450 of the elastic ring 446 may have a shape or profile that is substantially similar to the shape or profile of one of the corrugations 408 of the intermediate portion 406 of the diaphragm 314. Configuring the corrugations 408 and 450 of the diaphragm 314 and the elastic ring 446, respectively, to have substantially similar profiles increases the contact surface area between the elastic ring 446 and the diaphragm 316 and, thus, reduces stress or strain concentrations by distributing the stress or strain across a greater surface area. As a result, the cycle or fatigue life of the diaphragm 314 and the retainer ring 446 of the retainer 314 may be significantly improved.

As illustrated in FIG. 7, the second surface 716 of the diaphragm 314 engages a second surface 718 of the valve body 306. For example, the second surface 718 of the valve body 306 may include a curved or chamfered edge 720 to more evenly distribute or reduce the stress imparted to the diaphragm 314 during operation by increasing the contact area between the diaphragm 314 and the valve body 306 as the diaphragm 314 flexes toward the valve body 306. However, repeated displacement of the diaphragm 314 may cause the intermediate portion 406 of the diaphragm to impart repeated force onto the retainer 316. Such repeated force may create localized stress or strain within the elastic ring 316, causing the elastic ring 446 to fracture, break, erode and/or otherwise fail. In instances in which the elastic ring 446 of the retainer 316 fails, the elastic ring 446 may be removed from the groove 448 of the support ring 444, and a replacement elastic ring 416 may be inserted in its place. Because only a portion of the retainer 316 must be replaced upon failure, the elastic ring 446 may significantly reduce material costs associated with replacing the retainer 316.

Although certain example apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a valve body defining a fluid flow passageway;
   a diaphragm having a corrugated profile and positioned between the valve body and a bonnet;
   a washer to engage an outer circumferential portion of the diaphragm to clamp the diaphragm between the valve body and the bonnet, the washer positioned between the valve body and the bonnet and comprising:
     an elastomeric ring having a corrugated profile that corresponds to and engages a portion of the diaphragm having the corrugated profile; and
     a metallic ring to support the elastomeric ring; and
   a pusher plate coupled to a stem to engage a portion of the diaphragm, at least a portion of the pusher plate having a corrugated profile that corresponds to and engages the corrugated profile of the diaphragm.

2. The apparatus of claim 1, wherein the metallic ring is positioned between the valve body and the bonnet to engage the elastomeric ring to support the elastomeric ring.

3. The apparatus of claim 1, wherein the metallic ring comprises a groove to receive the elastomeric ring.

4. The apparatus of claim 3, wherein the groove of the metallic ring is adjacent an inner circumferential surface of the metallic ring.

5. The apparatus of claim 3, wherein an inner circumferential surface of the metallic ring is adjacent an inner circumferential surface of the elastomeric ring.

6. The apparatus of claim 3, wherein, without replacing the metallic ring, the elastomeric ring is to be removed from the groove of the metallic ring and a replacement elastomeric ring is to be inserted in the groove of the metallic ring.

7. The apparatus of claim 1, wherein a surface of the metallic ring is to engage a portion of the diaphragm having a substantially flat profile.

8. The apparatus of claim 7, wherein an outer circumferential surface of the metallic ring is adjacent an outer circumferential edge of the diaphragm.

9. The apparatus of claim 7, wherein the surface of the metallic ring that is to engage the diaphragm is adjacent a corrugated surface of the elastomeric ring.

10. The apparatus of claim 1, wherein a first surface of the washer is to engage a surface of the diaphragm.

11. The apparatus of claim 10, wherein a second surface of the washer opposite the first surface is to engage a surface of the bonnet.

12. The apparatus of claim 1, wherein the washer is received by a cavity formed by a shoulder of the valve body and an opposing shoulder of the bonnet.

13. The apparatus of claim 12, wherein the shoulder of the valve body defines a first groove that is to receive a first portion of the washer.

14. The apparatus of claim 13, wherein the shoulder of the bonnet defines a second groove that is to receive a second portion of the washer.

15. The apparatus of claim 1, wherein a portion of the pusher plate has a substantially flat profile that corresponds to and engages a portion of the diaphragm having a substantially flat profile.

\* \* \* \* \*